United States Patent
Qiu

(10) Patent No.: US 11,096,485 B2
(45) Date of Patent: Aug. 24, 2021

(54) STEEL CABLE STEERING DEVICE, STEEL CABLE STEERING SYSTEM AND LIFTING CABINET

(71) Applicant: CMECH (GUANGZHOU) LTD., Guangdong (CN)

(72) Inventor: Jia Sen Qiu, Guangdong (CN)

(73) Assignee: CMECH (GUANGZHOU) LTD., Guangdong (CN)

( * ) Notice: Subject to any disclaimer, the term of this patent is extended or adjusted under 35 U.S.C. 154(b) by 76 days.

(21) Appl. No.: 16/695,850

(22) Filed: Nov. 26, 2019

(65) Prior Publication Data

US 2021/0037968 A1    Feb. 11, 2021

(30) Foreign Application Priority Data

Aug. 5, 2019  (CN) .......................... 201910717730.6
Aug. 5, 2019  (CN) .......................... 201910718438.6

(Continued)

(51) Int. Cl.
*A47B 51/00*    (2006.01)
*A47B 57/06*    (2006.01)
(Continued)

(52) U.S. Cl.
CPC .............. *A47B 51/00* (2013.01); *A47B 57/06* (2013.01); *A47B 97/00* (2013.01); *B66D 1/12* (2013.01);
(Continued)

(58) Field of Classification Search
CPC ......... A47B 51/00; A47B 57/06; A47B 97/00; A47B 2051/005; A47B 2220/0002;
(Continued)

(56) References Cited

U.S. PATENT DOCUMENTS 2,762,606 A  *  9/1956  Morse ...................... H02G 1/08
                                                254/393
4,239,440 A    12/1980  James
(Continued)

FOREIGN PATENT DOCUMENTS

AT           514056 A4    10/2014
CN        201088284 Y     7/2008
(Continued)

*Primary Examiner* — Andrew M Roersma
(74) *Attorney, Agent, or Firm* — McKee, Voorhees & Sease, PLC

(57) ABSTRACT

A cable steering system directs steel cables, for lifting cabinet shelf. The cable steering system includes left and right devices each comprising a first transmission wheel for horizontally turning the cable, and a second transmission wheel for vertically turning the cable which extends out from the first transmission wheel; and the cable extending out from the second transmission wheel is located in the middle of a side edge of the cabinet body. With the steel cable steering devices of the lifting cabinet, each steel cable extends horizontally along the first transmission wheel, and then is directed vertically downwardly by the second transmission wheel, thereby the cable is connected to a middle part of a side edge of the lifting shelf, so that the lifting shelf bears a balanced force.

17 Claims, 3 Drawing Sheets

(30) Foreign Application Priority Data

Aug. 5, 2019 (CN) .......................... 201910718446.0
Aug. 5, 2019 (CN) .......................... 201921261566.4

(51) Int. Cl.
| | | |
|---|---|---|
| *A47B 97/00* | (2006.01) | |
| *F16H 25/20* | (2006.01) | |
| *F16H 25/22* | (2006.01) | |
| *B66D 1/12* | (2006.01) | |
| *B66D 1/20* | (2006.01) | |
| *B66D 1/26* | (2006.01) | |
| *B66D 1/30* | (2006.01) | |
| *B66D 1/36* | (2006.01) | |
| *B66D 1/60* | (2006.01) | |
| *B66D 3/18* | (2006.01) | |
| *B66D 3/26* | (2006.01) | |

(52) U.S. Cl.
CPC ................ *B66D 1/20* (2013.01); *B66D 1/26* (2013.01); *B66D 1/30* (2013.01); *B66D 1/36* (2013.01); *B66D 1/60* (2013.01); *B66D 3/18* (2013.01); *B66D 3/26* (2013.01); *F16H 25/20* (2013.01); *F16H 25/2204* (2013.01); *A47B 2220/0002* (2013.01); *A47B 2220/0091* (2013.01)

(58) Field of Classification Search
CPC .... A47B 2220/0013; A47B 2220/0091; B66D 1/12; B66D 1/20; B66D 1/26; B66D 1/30; B66D 1/36; B66D 1/60; B66D 3/18; B66D 3/26
See application file for complete search history.

(56) References Cited

U.S. PATENT DOCUMENTS

| | | | | |
|---|---|---|---|---|
| 5,871,070 A | * | 2/1999 | Contreras | B66D 1/04 |
| | | | | 187/263 |
| 5,921,352 A | * | 7/1999 | Garrido | B66B 11/08 |
| | | | | 187/264 |
| 6,676,233 B1 | | 1/2004 | Evans et al. | |
| 7,325,785 B2 | * | 2/2008 | Krengel | A47B 5/00 |
| | | | | 211/17 |
| 7,416,055 B2 | | 8/2008 | Penn et al. | |
| 9,420,881 B2 | * | 8/2016 | Reid | A47B 51/00 |
| 9,486,911 B1 | | 11/2016 | Liu | |
| 2006/0066188 A1 | | 3/2006 | Crawford | |
| 2007/0108791 A1 | | 5/2007 | Okninski | |
| 2014/0196555 A1 | | 7/2014 | Wu | |

FOREIGN PATENT DOCUMENTS

| | | | | |
|---|---|---|---|---|
| CN | 201480544 U | 5/2010 | | |
| CN | 202737328 U | 2/2013 | | |
| CN | 203885023 U | 10/2014 | | |
| CN | 203934851 U | 11/2014 | | |
| CN | 203934862 U | 11/2014 | | |
| CN | 204132770 U | 2/2015 | | |
| CN | 104466831 A | 3/2015 | | |
| CN | 205018553 U | 2/2016 | | |
| CN | 105595641 A | 5/2016 | | |
| CN | 106419297 A | * | 2/2017 | |
| CN | 109276039 A | 1/2019 | | |
| CN | 109733994 A | 5/2019 | | |
| CN | 109795952 A | 5/2019 | | |
| CN | 208988054 U | 6/2019 | | |
| CN | 109984467 A | 7/2019 | | |
| FR | 2920417 A1 | * | 3/2009 | ............. A47C 17/84 |
| GB | 2557699 A | 6/2018 | | |
| JP | 2014226508 A | 12/2014 | | |
| KR | 20130138069 A | 12/2013 | | |
| WO | WO-2005092148 A1 | * | 10/2005 | ............. A47B 51/00 |
| WO | 2010130570 A1 | 11/2010 | | |

* cited by examiner

STEEL CABLE STEERING DEVICE, STEEL CABLE STEERING SYSTEM AND LIFTING CABINET

PRIORITY CLAIMS AND INCORPORATION OF RELATED APPLICATIONS

This application claims priority to the following four Chinese applications, and incorporate by reference their related pending US applications in their entireties:

(A) Chinese application 201910718438.6, filed Aug. 5, 2019;

(B) Chinese application 201921261566.4, filed Aug. 5, 2019 and U.S. Ser. No. 16/695,659, filed Nov. 26, 2019, MVS Ref No. P13067US00;

(C) Chinese application 201910718446.0, filed Aug. 5, 2019, and U.S. Ser. No. 16/695,655, filed Nov. 26, 2019, MVS Ref No. P13068US00;

(D) Chinese application 201910717730.6, filed Aug. 5, 2019, and U.S. Ser. No. 16/695,789, filed Nov. 26, 2019, MVS Ref No. P13069US00.

FIELD OF THE INVENTION

The present invention relates to the technical field of cabinets, in particular to a steel cable steering device, a steel cable steering system, and a lifting cabinet.

BACKGROUND OF THE INVENTION

With the development of urbanization, many houses are small-sized. In order to ensure enough storage space, a hanging, automatically lifting cabinet is mounted indoors, wherein a cabinet body of the cabinet is equipped with a lifting shelf which may be lifted or lowered relative to the cabinet body and lower out from the bottom of the cabinet body.

However, in the existing lifting cabinet, a motor is used to drive the steel cable, and then the steel cable drives the lifting shelf to move. In order to save space occupied by the power mechanisms such as a motor, the power mechanism in the cabinet body is generally horizontally arranged in the middle of the cabinet body. As the power mechanism is horizontally arranged and it has a certain length, a steel cable which extends out from an outlet of the power mechanism and connects to a lifting shelf is unable to be connected to the middle part of either side edge of the lifting shelf, thereby the lifting shelf bears an unbalanced force.

SUMMARY OF THE INVENTION

Therefore, it is an objective of the present invention to provide a steel cable steering device of a lifting cabinet, which may guide the steel cable horizontal and vertical movement, and the vertical segment of the steel cable is connected to a middle of a side edge of a lifting shelf.

It is provided a steel cable steering device used for a lifting cabinet comprising a first transmission wheel and a second transmission wheel; wherein the first transmission wheel is used for horizontally turning a steel cable, the second transmission wheel is used for vertically turning the steel cable which extends out from the first transmission wheel. The steel cable extending downwardly from the second transmission wheel is connected to a middle part of a side edge of a lifting shelf.

In the steel cable steering device of the present invention, the steel cable firstly extends horizontally to the midperpendicular of a side edge of the cabinet body through the first transmission wheel, and then the steel cable extending out from the first transmission wheel is further vertically turned through the second transmission wheel, thereby the steel cable is connected to the middle part of a side edge of the lifting shelf, and the lifting shelf bears a balanced force.

Further, the steel cable between the first transmission wheel and the second transmission wheel remains horizontal.

In the steel cable steering device of the present invention, when the steel cable is sliding on the first transmission wheel or the second transmission wheel, it slides in the same direction with a groove in the first transmission wheel or second transmission wheel respectively by keeping the steel cable between the first transmission wheel and the second transmission wheel horizontal, thereby avoiding a situation that the steel cable is disengaged from the first or second transmission wheel.

Specifically, the steel cable steering device further comprises a housing, and a first slot for mounting the first transmission wheel, a second slot for mounting the second transmission wheel, and a first channel for communicating with the first slot and second slot are configured in the housing.

In the steel cable steering device of the present invention, the first slot and the steel cable outlet of the power mechanism of the lifting cabinet are located in a same plane, so that the steel cable between the first transmission wheel and the power mechanism keeps horizontal or nearly horizontal, thereby avoiding that a component force in another direction is generated to reduce the pull force on the lifting shelf due to the sideling configuration of the steel cable.

In the steel cable steering device of the present invention, a guide plate is configured in both the first slot and the second slot in the housing, wherein at least one guide block is configured on the guide plate, so that at least two guide grooves are formed between the first transmission wheel, the guide plate, and the guide block, and at least two guide grooves are formed between the second transmission wheel, the guide plate and the guide block. These guide grooves guide the two steel cables extending from the first transmission wheel or the second transmission wheel, to prevent the steel cables from shifting after the steel cable is turned, thereby ensuring that the steel cables will not be entangled.

It is another objective of the present embodiment to disclose a lifting cabinet, comprising a cabinet body, a lifting shelf movable in the cabinet body, a power mechanism for driving the lifting shelf and a steel cable steering device as above mentioned.

It is a further objective of the present embodiment to disclose a steel cable steering system of the lifting cabinet, comprising two groups of the steel cable steering device as above mentioned.

The two groups of the steel cable steering device are respectively disposed on both sides of the inside of the lifting cabinet body.

Further, the two groups of the steel cable steering devices are coupled to the two groups of steel cables extending out from the power mechanism of the lifting cabinet, and the two groups of steel cables are in the same plane.

In one group of the steel cable steering device, a first angle is formed in a horizontal direction between the steel cable extending into the first transmission wheel and the steel cable extending out from the first transmission wheel.

In another group of the steel cable steering device, a second angle is formed in a horizontal direction between the steel cable extending into the first transmission wheel and the steel cable extending out from the first transmission wheel.

The first angle is unequal to the second angle.

As the cabinet body has a tight space for mounting the power mechanism, the two groups of steel cables extending out from the power mechanism are disposed in a same horizontal plane, that is the two groups of steel cables are separated horizontally in a certain distance.

The steel cable steering system of the present invention comprises two groups of the steel cable steering device, wherein in one group of the steel cable steering device, a first angle is formed in a horizontal direction between the steel cable extending into the first transmission wheel and the steel cable extending out from the first transmission wheel; and in another group of the steel cable steering device, a second angle is formed. One of the groups of steel cables has a larger turning angle by making the first angle unequal to the second angle, thereby both the two groups of steel cables separated horizontally from each other in a distance are able to be connected to the middle part of a side edge of the lifting shelf.

It is a further objective of the present embodiment to disclose a lifting cabinet, comprising a cabinet body, a lifting shelf movable in the cabinet body, a power mechanism for driving the lifting shelf and a steel cable steering system as above mentioned.

For a better understanding and practice, the present invention will be described in detail with reference to accompanying figures.

DETAILED DESCRIPTION OF THE PREFERRED EMBODIMENTS

For a better illustration, the present invention will be further described in detail with reference to the accompanying figures.

Figure 1:
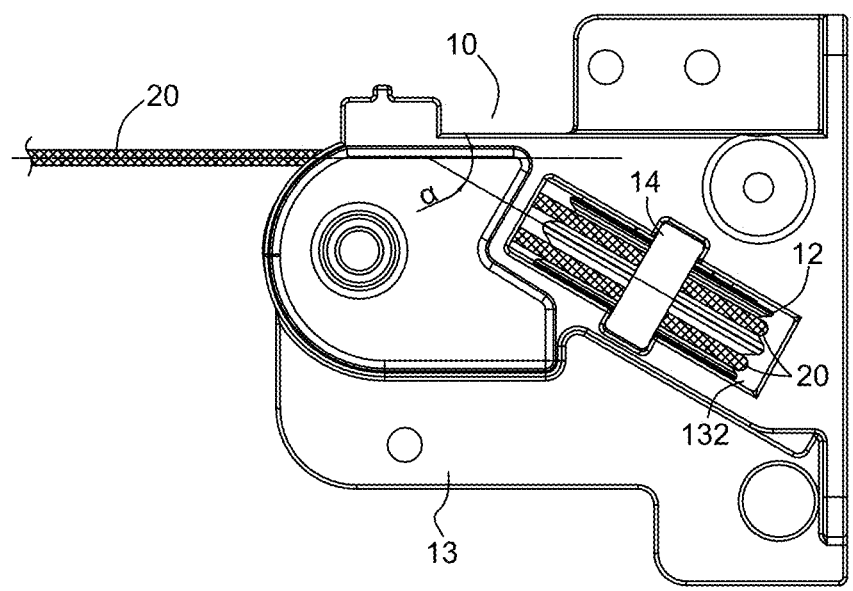
FIG. 1 is a top view of one group of a steel cable steering device of the embodiment of the present invention on a right-hand side of a lifting cabinet.
Figure 2:
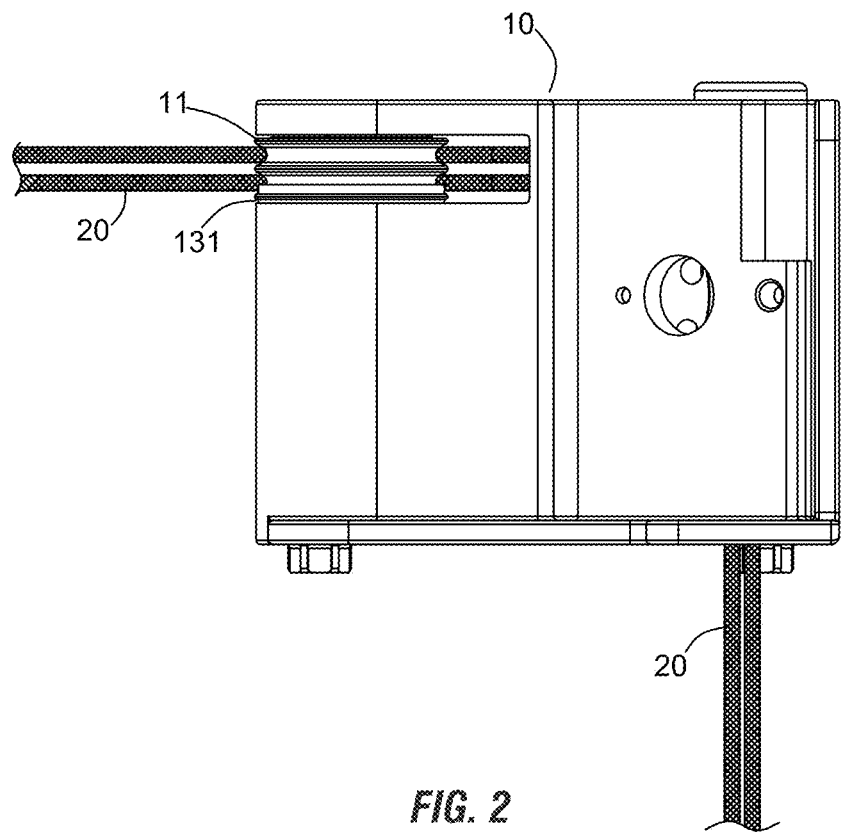
FIG. 2 is a front view of the one group of a steel cable steering device of the embodiment of the present invention.

As shown in FIG. 1 and FIG. 2, a pair of steel cable steering devices 10 on the top corners of a lifting cabinet each comprise a first transmission wheel 11 and a second transmission wheel 12; wherein the first transmission wheel 11 is used for horizontally turning a steel cable 20, and the second transmission wheel 12 is used for vertically turning the steel cable 20 which extends from the first transmission wheel 11. The steel cable 20 extending downwardly from the second transmission wheel 12 is connected to the middle part of a side edge of a lifting shelf in a lifting cabinet.

In the left and right steel cable steering devices 10 of this embodiment, firstly the steel cables 20 extend horizontally to the side edges of the cabinet body through the first transmission wheels 11, and then the steel cables 20 extending from the first transmission wheels are vertically turned through the second transmission wheels 12, so that the steel cables 20 are connected to the middle part of the side edges of the lifting shelf, thereby the lifting shelf bears a balanced force.

Figure 3:
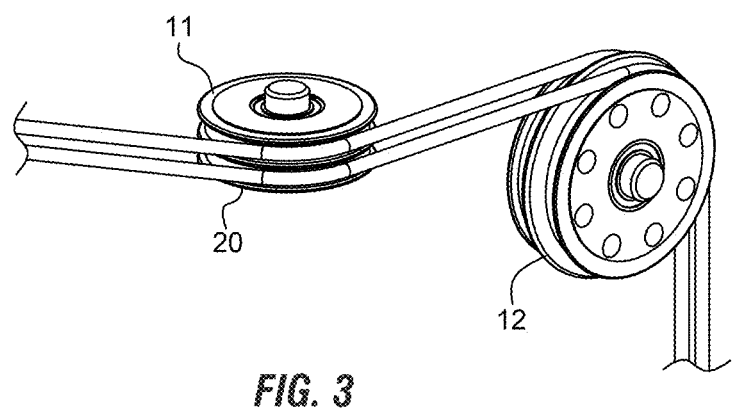
FIG. 3 is a rear perspective view of the one group of a steel cable steering device of the embodiment of the present invention with the housing removed.

Preferably, as shown in FIG. 3, the steel cables 20 between the first transmission wheel 11 and the second transmission wheel 12 is horizontal.

In each steel cable steering device 10 of this embodiment, when the steel cables 20 are sliding on the first transmission wheel 11 or the second transmission wheel 12, they slide in the same direction with grooves in the first transmission wheel 12 and second transmission wheel 12, respectively, by keeping the steel cables 20 between the first transmission wheel and the second transmission wheel horizontal 12, thereby avoiding a situation that the steel cables are detached from the first or second transmission wheel.

Specifically, the steel cable steering device further comprises a housing 13, and a first slot 131 for mounting the first transmission wheel 11, a second slot 132 for mounting the second transmission wheel 12, and a first channel for communicating with the first slot 131 and the second slot 132 are configured in the housing.

In the steel cable steering device 10 of this embodiment, the first slot 131 and an steel cable outlet of the power mechanism 40 of the lifting cabinet are located in a same plane, so that the steel cables between the first transmission wheel and the power mechanism keep horizontal or nearly horizontal, thereby avoiding that a component force in another direction is generated to reduce the pull force on the lifting shelf due to the sideling configuration of the steel cable.

Figure 4:
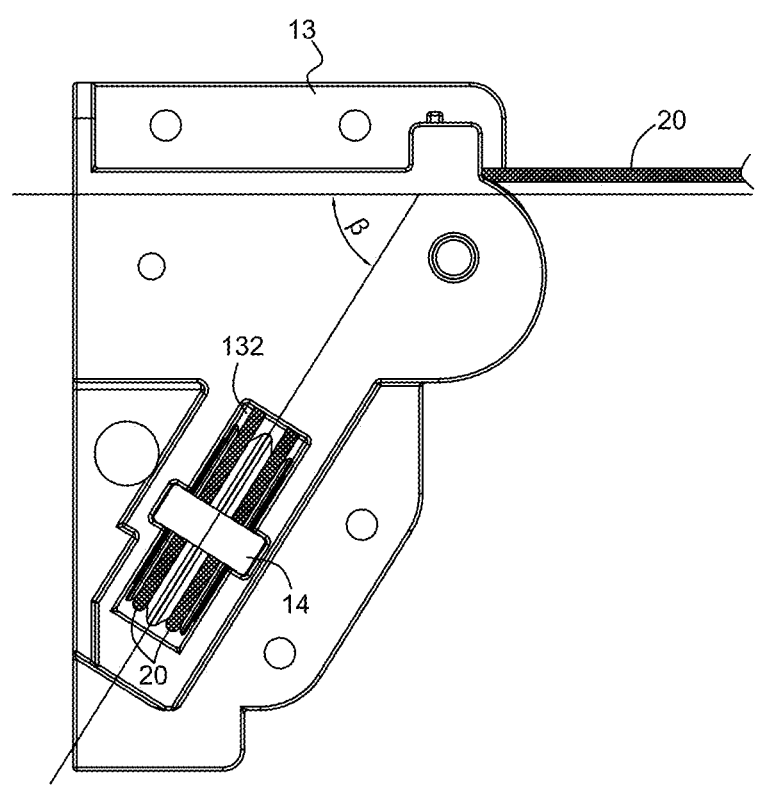
FIG. 4 is a top view of another group of a steel cable steering device of the embodiment of the present invention on a left-hand side of a lifting cabinet.

Preferably, as shown in FIG. 1 and FIG. 4, a guide plate 14 is configured in both the first slot 131 and the second slot 132, and at least one guide block 15 is configured in the guide plate 14.

Figure 5:
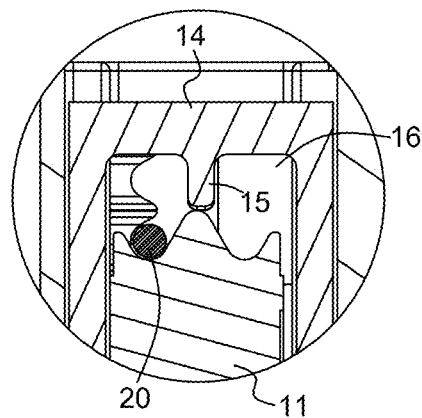
FIG. 5 is a sectional schematic view of a guide plate of the embodiment of the present invention.

As shown in FIG. 5, at least two guide grooves 16 are formed between the first transmission wheel 11, the guide plate 14 and the guide block 15, and at least two guide grooves 16 are formed between the second transmission wheel 12, the guide plate 14, and the guide block 15.

It should be noted that, as a structure of the guide plate 14 configured in the first slot 131 is basically the same as a structure of the guide plate configured in the second slot 132, the structure of the guide plate configured in the first slot is not shown in accompanying figures.

In each of the steel cable steering devices 10 of this embodiment, a guide plate 14 is configured in both the first slot 131 and the second slot 132 in the housing 13, wherein at least one guide block 15 is configured on the guide plate 14, so that at least two guide grooves 16 are formed between the first transmission wheel 11, the guide plate 14, the guide block 15, and at least two guide grooves are formed between the second transmission wheel 12, the guide plate and the guide block. These guide grooves guide two steel cables extending from the first transmission wheel or the second transmission wheel, to prevent the steel cables 20 from shifting after the steel cables are turned, thereby ensuring that the steel cables will not be entangled.

Figure 6:
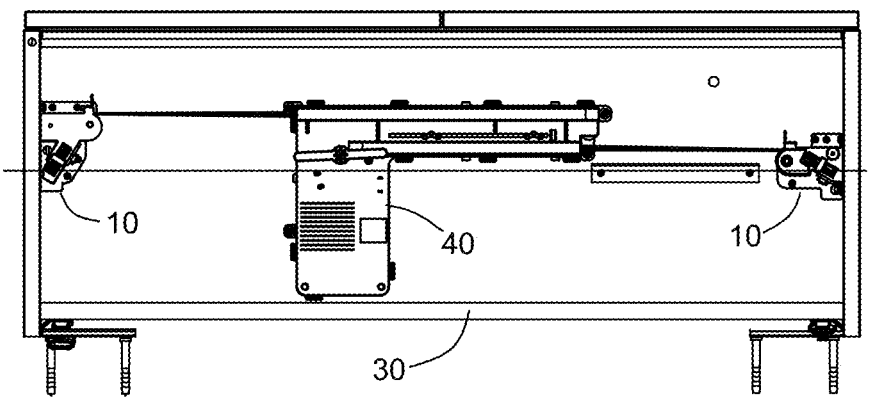
FIG. 6 is a top view of a steel cable steering system in a lifting cabinet of the embodiment of the present invention.

As shown in FIG. 6, it is an another objective of the present embodiment to disclose a lifting cabinet, comprising a cabinet body 30, a lifting shelf movable within the cabinet body 30, a power mechanism 40 for driving the lifting shelf, and a steel cable steering device 10 on each side of the body 30, as above mentioned.

It is a further objective of the present embodiment to disclose a steel cable steering system of the lifting cabinet, comprising two groups of the steel cable steering device 10 as above mentioned.

As shown in FIG. 6, the two groups of the steel cable steering device 10 are respectively disposed on both sides of the lifting cabinet body 30.

Further, the two groups of the steel cable steering devices 10 are coupled to the two groups of steel cables 20 extending out from the power mechanism 40 of the lifting cabinet, and the two groups of steel cables 20 are in the same plane at the top of the cabinet.

As seen in FIG. 1, one group of the steel cable steering device, a first angle α is formed in a horizontal direction between the steel cable extending into the first transmission wheel 11 and the steel cable extending out from the first transmission wheel 12.

As seen in FIG. 4, another group of the steel cable steering device, a second angle β is formed in a horizontal direction between the steel cable extending into the first transmission wheel and the steel cable extending out from the first transmission wheel.

The first angle α is unequal to the second angle β. More particularly, angle α is smaller than angle β.

As the cabinet body 30 has a tight space for mounting the power mechanism 40, the two groups of steel cables 20 extending from the power mechanism are disposed in a same horizontal plane, that is the two groups of steel cables are separated horizontally in a certain distance.

The steel cable steering system of the present invention comprises two groups of the steel cable steering device, wherein in one group of the steel cable steering device, a first angle α is formed in a horizontal direction between the steel cable extending into the first transmission wheel and the steel cable extending out from the first transmission wheel; and in another group of the steel cable steering device, a second angle β is formed. One of the groups of the steel cables has a larger turning angle by making the first angle α unequal to the second angle β, thereby both two groups of steel cables separated horizontally from each other in a certain distance are able to be connected to the middle part of a side edge of the lifting shelf.

It is a further objective of the present embodiment to disclose a lifting cabinet, comprising a cabinet body 30, a lifting shelf movable in the cabinet body 30, a power mechanism 40 for driving the lifting shelf and a steel cable steering system as above mentioned.

One skilled in the art may incorporate or combine different embodiments or examples, or technical features of different embodiments or examples disclosed in the description together if there are no contradictions In the description of the present invention, it should be understood that the terms "longitudinal", "lateral", "front", "back", "left", "right", "vertical", "horizontal", "top", "bottom", "inner", and "outer", etc., indicate direction or position relation is based on the direction or position relation shown in figures, and is only for convenience of describing the present invention and simplifying the description, rather than indicating or implying that the indicated apparatus or parts must be configured or operated in specific direction. Therefore, these terms should not be deemed as a limit to the content protected by the present invention.

If the terms "first", "second", etc. are used herein to define a component, one skilled in the art should understand that usage of terms "first" and "second" is only for the convenience of describing the present invention and simplifying the description. Unless otherwise stated, the terms hereinbefore have no specific meanings.

The present invention is not limited to the above embodiments. Any variations or modifications without departing from the spirit and scope of the invention and within the scope of claims and equivalent technology of the present invention will be also contained in the present invention.

What is claimed is:

1. A cable steering system, configured for use with a lifting cabinet, the cable steering system comprising:
   two cable steering devices; and
   two cables extending away from each other in a same plane;
   wherein each said cable steering device comprises:
      a first transmission wheel; and
      a second transmission wheel;
      wherein the first transmission wheel is used for horizontally turning one of the cables, the second transmission wheel is used for vertically steering the one of the cables which extends out from the first transmission wheel, and the one of the cables extending out from the second transmission wheel is configured to be connected to a middle part of a side edge of a lifting shelf; and
   wherein, in a first of the cable steering devices, a first angle is formed in a horizontal direction between the cable extending into the first transmission wheel and the cable extending out from the first transmission wheel;
   in a second of the cable steering devices, a second angle is formed in a horizontal direction between the cable extending into the first transmission wheel and the cable extending out from the first transmission wheel; and
   the first angle is unequal to the second angle.

2. The cable steering system according to claim 1, wherein each said cable between the first transmission wheel and the second transmission wheel is horizontal.

3. The cable steering system according to claim 1, wherein each said cable steering device further comprises a housing, the housing comprising:
   a first slot for mounting the first transmission wheel,
   a second slot for mounting the second transmission wheel, and
   a first channel for communicating with the first slot and the second slot.

4. The cable steering system according to claim 3, wherein the first slot and a cable outlet of the power mechanism of the lifting cabinet are located in a same plane, so that the cable between the first transmission wheel and the power mechanism keeps horizontal.

5. The cable steering system according to claim 3, wherein a guide plate is configured in both the first slot and the second slot, at least one guide block is configured on the guide plate, at least two guide grooves are formed between the first transmission wheel, the guide plate and the guide block, and at least two guide grooves are formed between the second transmission wheel, the guide plate and the guide block.

6. A lifting cabinet, comprising:
   a cabinet body;
   a lifting shelf, movable in the cabinet body;
   a power mechanism for driving the lifting shelf; and
   the cable steering system according to claim 1, wherein the cables extend in the same plane between the power mechanism and the cable steering devices, and the cables each connect to a middle part of a side edge of the lifting shelf.

7. A lifting cabinet, comprising:
a body;
a shelf mounted in the body for vertical movement;
a power mechanism for raising and lowering the shelf;
left and right cables extending between the power mechanism and left and right sides of the shelf, respectively;
left and right first cable guide wheels on opposite sides of the power mechanism to provide horizontal tracking of the left and right cables;
left and right second cable guide wheels between the left and right first cable guide wheels and left and right sides of the cabinet body, respectively, to provide vertical tracking of the left and right cables, respectively; and
wherein, a first angle is formed in a horizontal direction between the left cable extending into the left first cable guide wheel and the left cable extending out of the left first cable guide wheel;
a second angle is formed in a horizontal direction between the right cable extending into the right first cable guide wheel and the right cable extending out of the right first cable guide wheel; and
the first angle is unequal to the second angle.

8. The lifting cabinet of claim 7 wherein the first cable guide wheels have a vertical axis of rotation and the second cable guide wheels have a horizontal axis of rotation.

9. The lifting cabinet of claim 8 wherein the horizontal axis of rotation is oriented approximately 45° relative to a rear corner of the cabinet.

10. The lifting cabinet of claim 7 wherein each of the cable guide wheels include a groove for receiving one of the cables.

11. The lifting cabinet of claim 7 further comprising left and right housings for the left and right first and second cable guide wheels.

12. The lifting cabinet of claim 11 wherein each of the housings includes first and second slots for the first and second cable guide wheels, respectively.

13. The lifting cabinet of claim 7 wherein the left and right cables each have horizontal segments and vertical segments.

14. The lifting cabinet of claim 13 wherein the horizontal segments of the left and right cables are spaced apart along a top portion of the body.

15. The lifting cabinet of claim 13 wherein the horizontal segments of the left and right cables are offset horizontally from one another.

16. The lifting cabinet of claim 7 wherein the second cable guide wheels direct the cables downwardly to opposite sides of the shelf.

17. The lifting cabinet of claim 7 further comprising a guide plate adjacent each said cable guide wheel to maintain the cable on the cable guide wheel.

* * * * *